US012315998B2

(12) United States Patent
Wu et al.

(10) Patent No.: US 12,315,998 B2
(45) Date of Patent: May 27, 2025

(54) ELECTRONIC DEVICES HAVING MULTILAYER MILLIMETER WAVE ANTENNAS

(71) Applicant: Apple Inc., Cupertino, CA (US)

(72) Inventors: Jiangfeng Wu, San Jose, CA (US); Lijun Zhang, Los Gatos, CA (US); Mattia Pascolini, San Francisco, CA (US); Siwen Yong, San Francisco, CA (US); Yi Jiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/521,521

(22) Filed: Nov. 28, 2023

(65) Prior Publication Data

US 2024/0097320 A1 Mar. 21, 2024

Related U.S. Application Data

(63) Continuation of application No. 17/751,495, filed on May 23, 2022, now Pat. No. 11,894,608, which is a continuation of application No. 17/028,864, filed on Sep. 22, 2020, now Pat. No. 11,349,204.

(51) Int. Cl.

| | |
|---|---|
| ***H01Q 1/52*** | (2006.01) |
| ***H01Q 3/34*** | (2006.01) |
| ***H01Q 5/385*** | (2015.01) |
| ***H01Q 9/04*** | (2006.01) |
| ***H01Q 19/00*** | (2006.01) |

(52) U.S. Cl.

CPC ............... *H01Q 1/523* (2013.01); *H01Q 3/34* (2013.01); *H01Q 5/385* (2015.01); *H01Q 9/0414* (2013.01); *H01Q 19/005* (2013.01)

(58) Field of Classification Search

CPC ...... H01Q 9/0414; H01Q 9/0435; H01Q 1/52; H01Q 1/521; H01Q 1/523; H01Q 19/005; H01Q 21/06; H01Q 21/061; H01Q 21/065; H01Q 5/385

See application file for complete search history.

(56) References Cited

U.S. PATENT DOCUMENTS 5,926,137 A * 7/1999 Nealy .................. H01Q 21/245 343/873

6,133,882 A 10/2000 LaFleur et al.

(Continued)

*Primary Examiner* — Jason M Crawford

(74) *Attorney, Agent, or Firm* — Treyz Law Group, P.C.; Michael H. Lyons

(57) ABSTRACT

An electronic device may have a phased antenna array. An antenna in the array may include a rectangular patch element with diagonal axes. The antenna may have first and second antenna feeds coupled to the patch element along the diagonal axes. The antenna may be rotated at a forty-five degree angle relative to other antennas in the array. The antenna may have one or two layers of parasitic elements overlapping the patch element. For example, the antenna may have a layer of coplanar parasitic patches separated by a gap. The antenna may also have an additional parasitic patch that is located farther from the patch element than the layer of coplanar parasitic patches. The additional parasitic patch may overlap the patch element and the gap in the coplanar parasitic patches. The antenna may exhibit a relatively small footprint and minimal mutual coupling with other antennas in the array.

19 Claims, 11 Drawing Sheets

(56) References Cited

U.S. PATENT DOCUMENTS 6,583,766 B1* 6/2003 Rawnick .............. H01Q 9/0407
343/846
6,977,614 B2 12/2005 Poe et al.
9,667,290 B2 5/2017 Ouyang et al.
10,461,428 B2* 10/2019 Jeong ..................... H01Q 5/385
10,658,762 B2 5/2020 Paulotto et al.
10,714,906 B1 7/2020 Ban
10,741,906 B2* 8/2020 Gomez Angulo ....... H01Q 5/42
10,741,933 B2 8/2020 Yong et al.
10,763,589 B2 9/2020 Wu et al.
10,777,895 B2 9/2020 Paulotto et al.
11,121,469 B2 9/2021 Paulotto et al.
11,349,204 B2* 5/2022 Wu ........................ H01Q 1/523
11,894,608 B2* 2/2024 Wu ........................ H01Q 5/385
2005/0054317 A1* 3/2005 Ro ....................... H01Q 9/0414
455/575.1
2015/0333407 A1* 11/2015 Yamagajo .............. H01Q 5/307
343/905
2017/0256867 A1* 9/2017 Ding ...................... H01Q 15/14
2018/0151947 A1* 5/2018 Apostolos ............ H01Q 1/2291
2018/0159203 A1 6/2018 Baks et al.
2019/0020110 A1* 1/2019 Paulotto ................. H01Q 5/392
2019/0020114 A1* 1/2019 Paulotto ................... H01Q 9/40
2019/0148839 A1* 5/2019 Lin ........................ H01Q 21/30
343/700 R
2019/0267718 A1* 8/2019 Rajagopalan .......... H01Q 1/523
2019/0319364 A1* 10/2019 Yang ...................... H01Q 5/364
2019/0379134 A1* 12/2019 Paulotto ............... H01Q 21/062
2020/0021037 A1* 1/2020 Wu ...................... H01Q 9/0457
2020/0076078 A1* 3/2020 Tehran ................... H01Q 21/24
2020/0106158 A1* 4/2020 Gomez Angulo .... G06F 1/1698
2020/0106183 A1* 4/2020 Fabrega Sanchez ........................
H04B 1/0458
2020/0106192 A1* 4/2020 Avser ..................... H01Q 1/405
2020/0127387 A1* 4/2020 Park ......................... H01Q 9/30
2020/0220249 A1* 7/2020 Asaf .................... H01Q 25/001
2020/0373672 A1* 11/2020 Paulotto ................. H01Q 5/378
2021/0098882 A1* 4/2021 Paulotto ................. H01Q 1/243
2021/0098894 A1* 4/2021 Haviv .................. H01Q 21/062
2022/0094048 A1* 3/2022 Wu ...................... H01Q 9/0414
2022/0094061 A1* 3/2022 Yong ...................... H01Q 5/385
2022/0263225 A1* 8/2022 Jia .......................... H01Q 1/243
2022/0285834 A1* 9/2022 Wu .......................... H01Q 3/34
2022/0407233 A1* 12/2022 Woo ..................... H04B 7/0617
2024/0097320 A1* 3/2024 Wu ...................... H01Q 9/0414

* cited by examiner

ELECTRONIC DEVICES HAVING MULTILAYER MILLIMETER WAVE ANTENNAS

This application is a continuation of U.S. patent application Ser. No. 17/751,495, filed May 23, 2022, which is a continuation of U.S. patent application Ser. No. 17/028,864, filed Sep. 22, 2020, now U.S. Pat. No. 11,349,204, each of which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies may support high bandwidths, but may raise significant challenges. For example, millimeter wave communications signals generated by antennas can be characterized by substantial attenuation and/or distortion during signal propagation through various mediums. In addition, if care is not taken, the antennas can be susceptible to undesirable mutual coupling.

It would therefore be desirable to be able to provide electronic devices with improved wireless communications circuitry such as communications circuitry that supports millimeter and centimeter wave communications.

SUMMARY

An electronic device may be provided with wireless circuitry. The wireless circuitry may include a phased antenna array. The phased antenna array may convey radio-frequency signals in a signal beam at a frequency greater than 10 GHz.

An antenna in the phased antenna array may include a rectangular patch element. The rectangular patch element may have first and second diagonal axes. The antenna may have a first positive antenna feed terminal coupled to the rectangular patch element along the first diagonal axis. The antenna may have a second positive antenna feed terminal coupled to the rectangular patch element along the second diagonal axis. The antenna may be rotated at a forty-five degree angle with respect to adjacent antennas in the phased antenna array.

The antenna may have parasitic elements overlapping the patch element. For example, the antenna may have five parasitics formed in a single layer overlapping the patch element. Gaps may separate each of the parasitic s from each other. As another example, the antenna may have a layer of coplanar parasitic patches overlapping the patch element. The parasitic patches in this layer may be separated by a gap. The antenna may also have an additional parasitic patch that is located farther from the patch element than the layer of coplanar parasitic patches. The additional parasitic patch may overlap the patch element and the gap in the layer of coplanar parasitic patches. When configured in this way, the antenna may exhibit a relatively small footprint and minimal mutual coupling with other antennas in the array.

DETAILED DESCRIPTION

Figure 1:
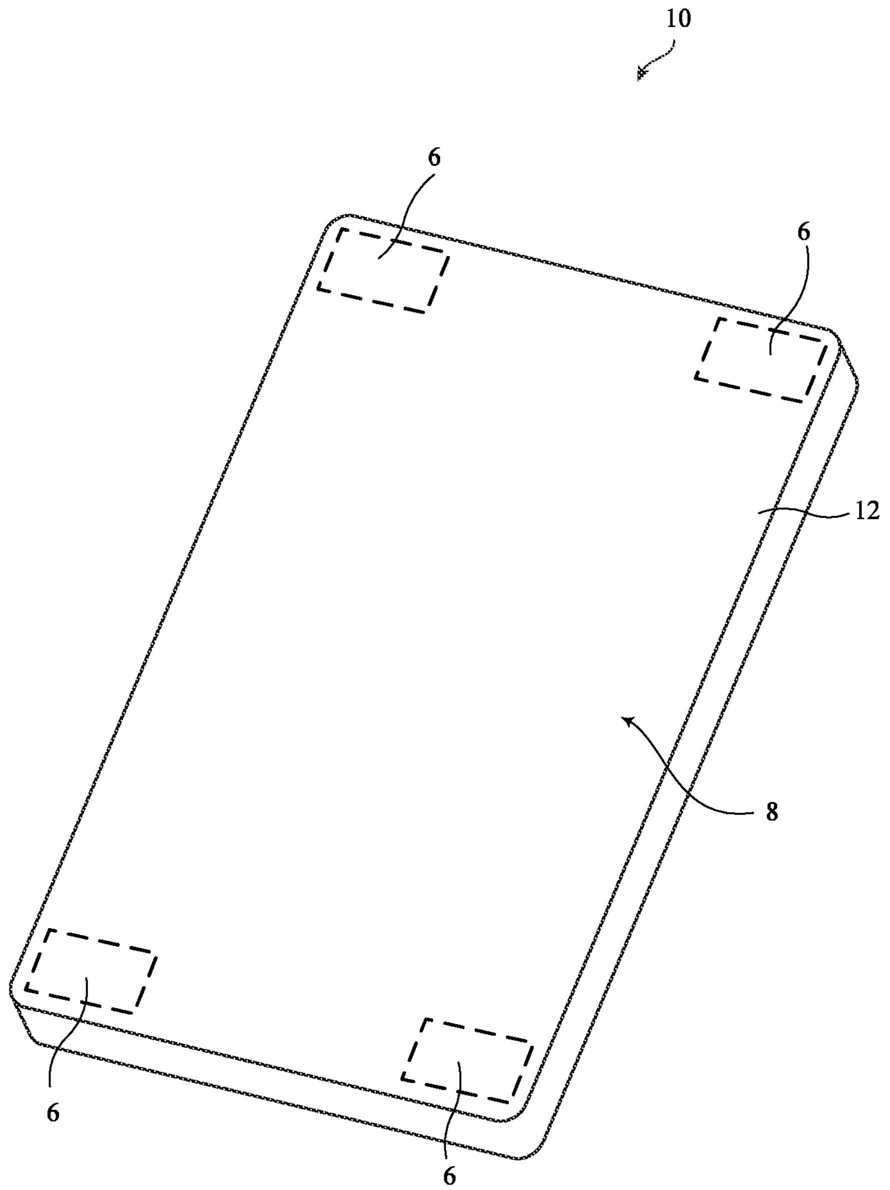
FIG. 1 is a front perspective view of an illustrative electronic device with wireless circuitry in accordance with some embodiments.

An electronic device such as electronic device 10 of FIG. 1 may contain wireless circuitry. The wireless circuitry may include one or more antennas. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a virtual or augmented reality headset device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless access point or base station, a desktop computer, a portable speaker, a keyboard, a gaming controller, a gaming system, a computer mouse, a mousepad, a trackpad or touchpad, equipment that implements the functionality of two or more of these devices, or other electronic equipment. In the illustrative configuration of FIG. 1, device 10 is a portable device such as a cellular telephone, media player, tablet computer, portable speaker, or other portable computing device. Other configurations may be used for device 10 if desired. The example of FIG. 1 is merely illustrative.

As shown in FIG. 1, device 10 may include a display such as display 8. Display 8 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 8 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch sensor electrodes may be formed from an array of indium tin oxide pads or other transparent conductive structures.

Display 8 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 8 may be protected using a display cover layer such as a layer of transparent glass, clear plastic, sapphire, or other transparent dielectrics. Openings may be formed in the display cover layer. For example, openings may be formed in the display cover layer to accommodate one or more buttons, sensor circuitry such as a fingerprint sensor or light sensor, ports such as a speaker port or microphone port, etc. Openings may be formed in housing 12 to form communications ports (e.g., an audio jack port, a digital data port, charging port, etc.). Openings in housing 12 may also be formed for audio components such as a speaker and/or a microphone.

Antennas may be mounted in housing 12. If desired, some of the antennas (e.g., antenna arrays that implement beam steering, etc.) may be mounted under an inactive border region of display 8 (see, e.g., illustrative antenna locations 6 of FIG. 1). Display 8 may contain an active area with an array of pixels (e.g., a central rectangular portion). Inactive areas of display 8 are free of pixels and may form borders for the active area. If desired, antennas may also operate through dielectric-filled openings in the rear of housing 12 or elsewhere in device 10.

To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when one or more antennas is being adversely affected due to the orientation of housing 12, blockage by a user's hand or other external object, or other environmental factors. Device 10 can then switch one or more replacement antennas into use in place of the antennas that are being adversely affected.

Antennas may be mounted at the corners of housing 12 (e.g., in corner locations 6 of FIG. 1 and/or in corner locations on the rear of housing 12), along the peripheral edges of housing 12, on the rear of housing 12, under the display cover glass or other dielectric display cover layer that is used in covering and protecting display 8 on the front of device 10, over a dielectric window on a rear face of housing 12 or the edge of housing 12, over a dielectric cover layer such as a dielectric rear housing wall that covers some or all of the rear face of device 10, or elsewhere in device 10.

Figure 2:
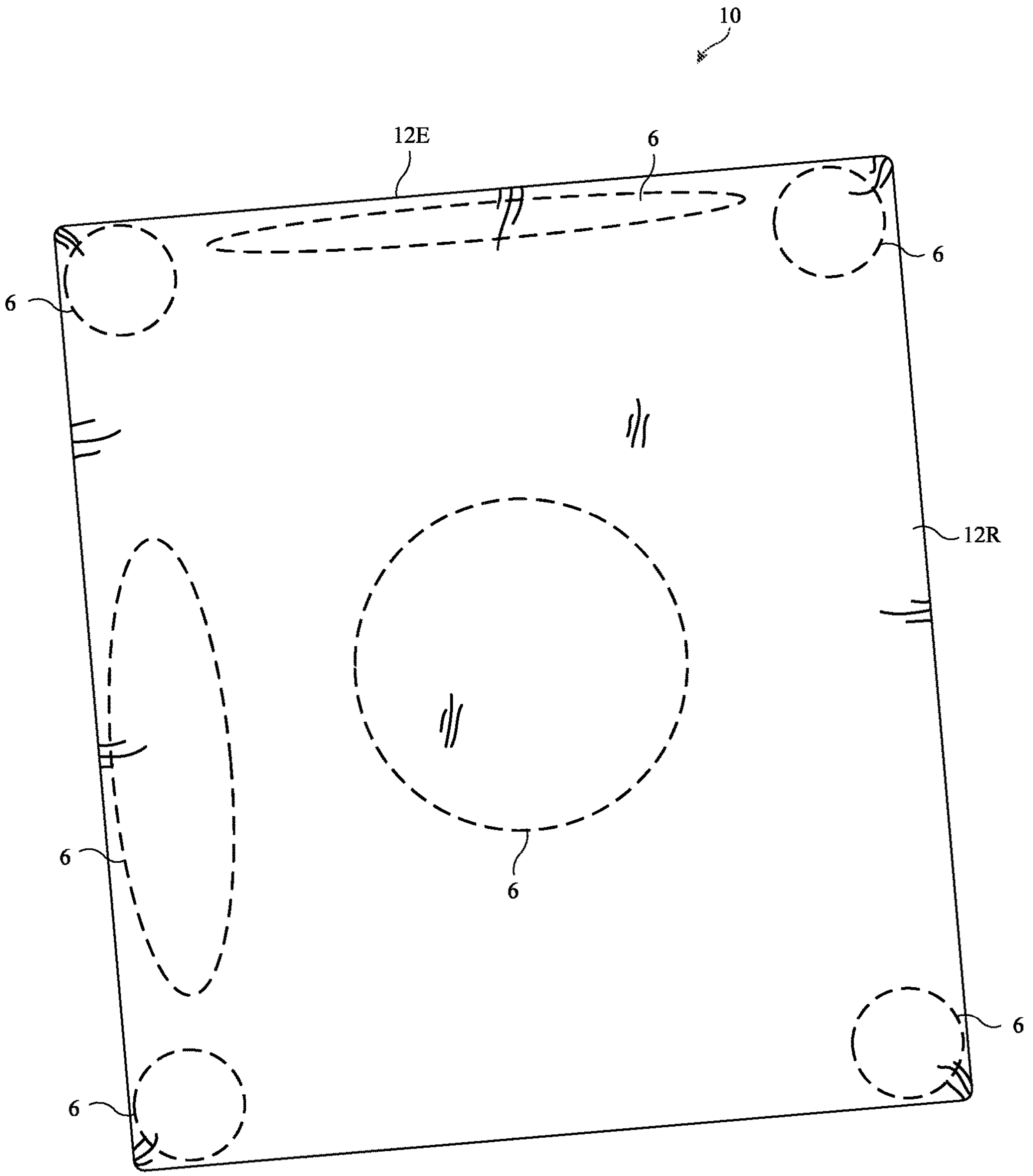
FIG. 2 is a rear perspective view of an illustrative electronic device with wireless circuitry in accordance with some embodiments.

FIG. 2 is a rear perspective view of electronic device 10 showing illustrative locations 6 on the rear and sides of housing 12 in which antennas (e.g., single antennas and/or phased antenna arrays) may be mounted in device 10. The antennas may be mounted at the corners of device 10, along the edges of housing 12 such as edges formed by sidewalls 12E, on upper and lower portions of rear housing wall 12R, in the center of rear housing wall 12R (e.g., under a dielectric window structure or other antenna window in the center of rear housing wall 12R), at the corners of rear housing wall 12R (e.g., on the upper left corner, upper right corner, lower left corner, and lower right corner of the rear of housing 12 and device 10), etc.

In configurations in which housing 12 is formed entirely or nearly entirely from a dielectric (e.g., plastic, glass, sapphire, ceramic, fabric, etc.), the antennas may transmit and receive antenna signals through any suitable portion of the dielectric. In configurations in which housing 12 is formed from a conductive material such as metal, regions of the housing such as slots or other openings in the metal may be filled with plastic or other dielectrics. The antennas may be mounted in alignment with the dielectric in the openings. These openings, which may sometimes be referred to as dielectric antenna windows, dielectric gaps, dielectric-filled openings, dielectric-filled slots, elongated dielectric opening regions, etc., may allow antenna signals to be transmitted to external wireless equipment from the antennas mounted within the interior of device 10 and may allow internal antennas to receive antenna signals from external wireless equipment. In another suitable arrangement, the antennas may be mounted on the exterior of conductive portions of housing 12.

FIGS. 1 and 2 are merely illustrative. In general, housing 12 may have any desired shape (e.g., a rectangular shape, a cylindrical shape, a spherical shape, combinations of these, etc.). Display 8 of FIG. 1 may be omitted if desired. Antennas may be located within housing 12, on housing 12, and/or external to housing 12.

Figure 3:
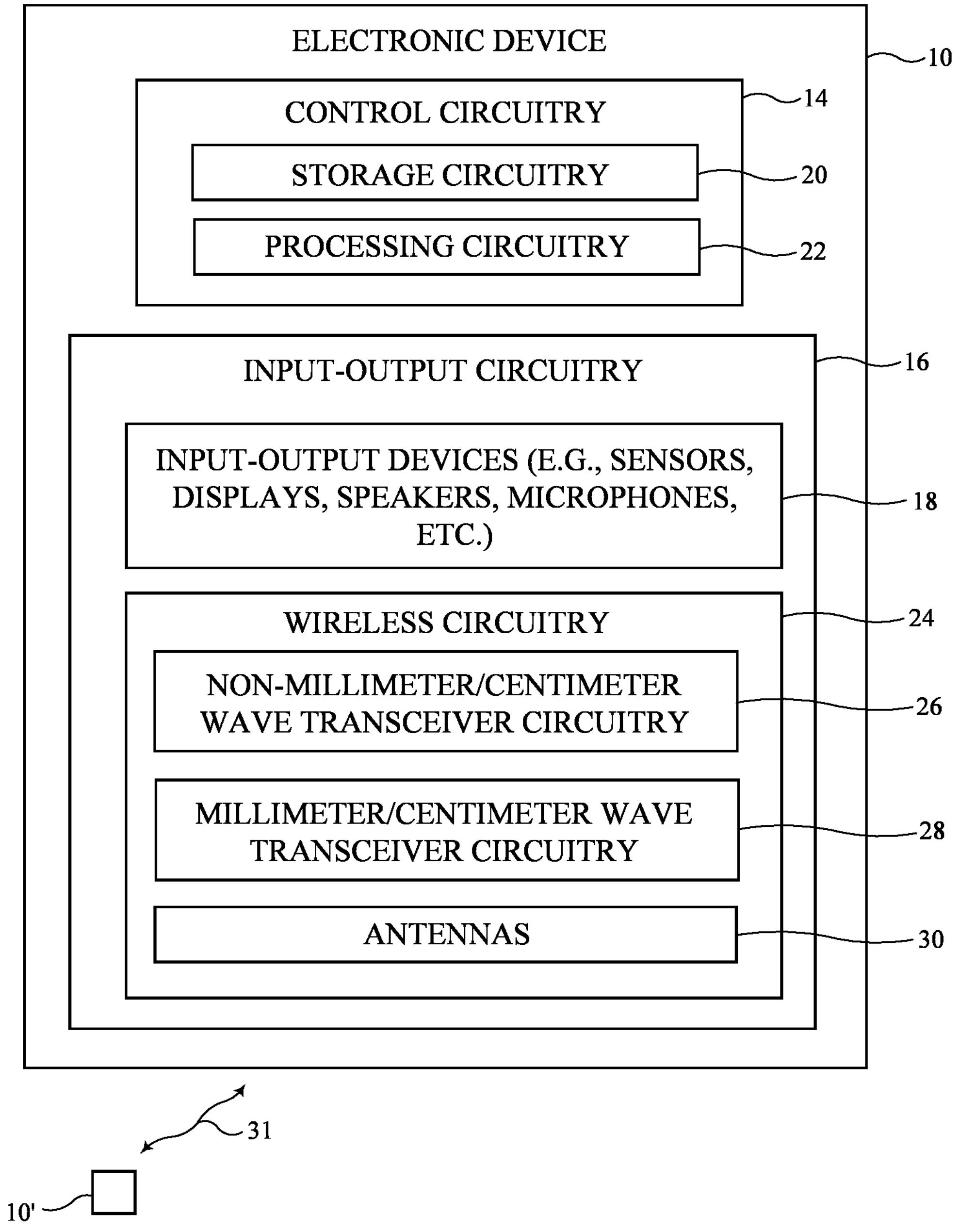
FIG. 3 is a schematic diagram of an illustrative electronic device with wireless circuitry in accordance with some embodiments.

A schematic diagram of illustrative components that may be used in device 10 is shown in FIG. 3. As shown in FIG. 3, device 10 may include control circuitry 14. Control circuitry 14 may include storage such as storage circuitry 20. Storage circuitry 20 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 14 may include processing circuitry such as processing circuitry 22. Processing circuitry 22 may be used to control the operation of device 10. Processing circuitry 22 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 20 (e.g., storage circuitry 20 may include non-transitory (tangible) computer readable storage media that stores the software code). The software code may sometimes be referred to as program instructions, software, data, instructions, or code. Software code stored on storage circuitry 20 may be executed by processing circuitry 22.

Control circuitry 14 may be used to run software on device 10 such as internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 16. Input-output circuitry 16 may include input-output devices 18. Input-output devices 18 may be used to allow data to be supplied to device 10 and to allow data to be provided from device 10 to external devices. Input-output devices 18 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 16 may include wireless circuitry such as wireless circuitry 24 for wirelessly conveying radio-frequency signals. While control circuitry 14 is shown separately from wireless circuitry 24 in the example of FIG. 3 for the sake of clarity, wireless circuitry 24 may include processing circuitry that forms a part of processing circuitry 22 and/or storage circuitry that forms a part of storage circuitry 20 of control circuitry 14 (e.g., portions of control circuitry 14 may be implemented on wireless circuitry 24). As an example, control circuitry 14 may include baseband processor circuitry or other control components that form a part of wireless circuitry 24.

Wireless circuitry 24 may include millimeter and centimeter wave transceiver circuitry such as millimeter/centimeter wave transceiver circuitry 28. Millimeter/centimeter wave transceiver circuitry 28 may support communications at frequencies between about 10 GHz and 300 GHz. For example, millimeter/centimeter wave transceiver circuitry 28 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 28 may support communications in an IEEE K communications band between about 18 GHz and 27 GHz, a K a communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 28 may support IEEE 802.11ad communications at 60 GHz and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 28 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 28 (sometimes referred to herein simply as transceiver circuitry 28 or millimeter/centimeter wave circuitry 28) may perform spatial ranging operations using radio-frequency signals at millimeter and/or centimeter wave frequencies that are transmitted and received by millimeter/centimeter wave transceiver circuitry 28. The received signals may be a version of the transmitted signals that have been reflected off of external objects and back towards device 10. Control circuitry 14 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 14 may also process the transmitted and received signals to identify a two or three-dimensional spatial location of the external objects relative to device 10.

Spatial ranging operations performed by millimeter/centimeter wave transceiver circuitry 28 are unidirectional. If desired, millimeter/centimeter wave transceiver circuitry 28 may also perform bidirectional communications with external wireless equipment such as external wireless equipment 10' (e.g., over bi-directional millimeter/centimeter wave wireless communications link 31). External wireless equipment 10' may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 28 and the reception of wireless data that has been transmitted by external wireless equipment 10'.

The wireless data may, for example, include data that has been encoded into corresponding data packets such as wireless data associated with a telephone call, streaming media content, internet browsing, wireless data associated with software applications running on device 10, email messages, etc.

If desired, wireless circuitry 24 may include transceiver circuitry for handling communications at frequencies below 10 GHz such as non-millimeter/centimeter wave transceiver circuitry 26. For example, non-millimeter/centimeter wave transceiver circuitry 26 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as “bands,” and may span corresponding ranges of frequencies. Non-millimeter/centimeter wave transceiver circuitry 26 and millimeter/centimeter wave transceiver circuitry 28 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 24 may cover (handle) any desired frequency bands of interest. As shown in FIG. 3, wireless circuitry 24 may include antennas 30. The transceiver circuitry may convey radio-frequency signals using one or more antennas 30 (e.g., antennas 30 may convey the radio-frequency signals for the transceiver circuitry). The term “convey radio-frequency signals” as used herein means the transmission and/or reception of the radio-frequency signals (e.g., for performing unidirectional and/or bidirectional wireless communications with external wireless communications equipment). Antennas 30 may transmit the radio-frequency signals by radiating the radio-frequency signals into free space (or to freespace through intervening device structures such as a dielectric cover layer). Antennas 30 may additionally or alternatively receive the radio-frequency signals from free space (e.g., through intervening devices structures such as a dielectric cover layer). The transmission and reception of radio-frequency signals by antennas 30 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 28 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 30 in wireless circuitry 24 may be formed using any suitable antenna types. For example, antennas 30 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. If desired, one or more of antennas 30 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 26 and another type of antenna may be used in conveying radio-frequency signals at millimeter and/or centimeter wave frequencies for millimeter/centimeter wave transceiver circuitry 28. Antennas 30 that are used to convey radio-frequency signals at millimeter and centimeter wave frequencies may be arranged in one or more phased antenna arrays. In one suitable arrangement that is described herein as an example, the antennas 30 that are arranged in a corresponding phased antenna array may be stacked patch antennas having patch antenna resonating elements that overlap and are vertically stacked with respect to one or more parasitic patch elements.

Figure 4:
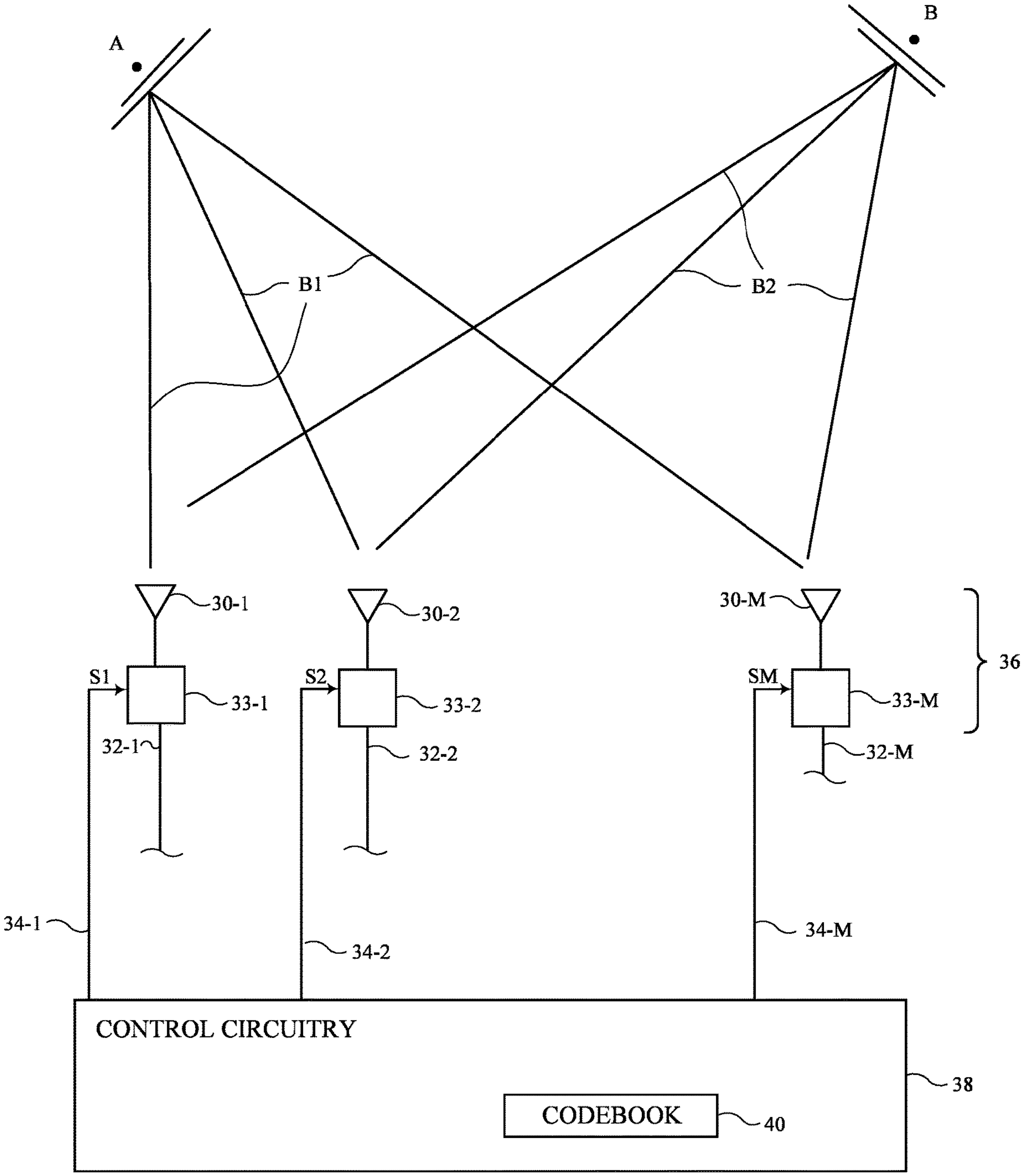
FIG. 4 is a diagram of an illustrative phased antenna array that forms a radio-frequency signal beam at different beam pointing angles in accordance with some embodiments.

FIG. 4 is a diagram showing how antennas 30 for handling radio-frequency signals at millimeter and centimeter wave frequencies may be formed in a phased antenna array. As shown in FIG. 4, phased antenna array 36 (sometimes referred to herein as array 36, antenna array 36, or array 36 of antennas 30) may be coupled to radio-frequency transmission line paths 32. For example, a first antenna 30-1 in phased antenna array 36 may be coupled to a first radio-frequency transmission line path 32-1, a second antenna 30-2 in phased antenna array 36 may be coupled to a second radio-frequency transmission line path 32-2, an Mth antenna 30-M in phased antenna array 36 may be coupled to an Mth radio-frequency transmission line path 32-M, etc. While antennas 30 are described herein as forming a phased antenna array, the antennas 30 in phased antenna array 36 may sometimes also be referred to as collectively forming a single phased array antenna (e.g., where each antenna 30 in the phased array antenna forms an antenna element of the phased array antenna).

Radio-frequency transmission line paths 32 may each be coupled to millimeter/centimeter wave transceiver circuitry 28 of FIG. 3. Each radio-frequency transmission line path 32 may include one or more radio-frequency transmission lines, a positive signal conductor, and a ground signal conductor. The positive signal conductor may be coupled to a positive antenna feed terminal on an antenna resonating element of the corresponding antenna 30. The ground signal conductor may be coupled to a ground antenna feed terminal on an antenna ground for the corresponding antenna 30.

Radio-frequency transmission line paths 32 may include stripline transmission lines (sometimes referred to herein simply as striplines), coaxial cables, coaxial probes realized by metalized vias, microstrip transmission lines, edge-coupled microstrip transmission lines, edge-coupled stripline transmission lines, waveguide structures, conductive vias, combinations of these, etc. Multiple types of transmission lines may be used to couple the millimeter/centimeter wave transceiver circuitry to phased antenna array 36. Filter circuitry, switching circuitry, impedance matching circuitry, phase shifter circuitry, amplifier circuitry, and/or other circuitry may be interposed on radio-frequency transmission line path 32, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Antennas 30 in phased antenna array 36 may be arranged in any desired number of rows and columns or in any other desired pattern (e.g., the antennas need not be arranged in a grid pattern having rows and columns). During signal transmission operations, radio-frequency transmission line paths 32 may be used to supply signals (e.g., radio-frequency signals such as millimeter wave and/or centimeter wave signals) from millimeter/centimeter wave transceiver circuitry 28 (FIG. 3) to phased antenna array 36 for wireless transmission. During signal reception operations, radio-frequency transmission line paths 32 may be used to convey signals received at phased antenna array 36 (e.g., from external wireless equipment 10' of FIG. 3) to millimeter/centimeter wave transceiver circuitry 28 (FIG. 3).

The use of multiple antennas 30 in phased antenna array 36 allows radio-frequency beam forming arrangements (sometimes referred to herein as radio-frequency beam steering arrangements) to be implemented by controlling the relative phases and magnitudes (amplitudes) of the radio-frequency signals conveyed by the antennas. In the example of FIG. 4, the antennas 30 in phased antenna array 36 each have a corresponding radio-frequency phase and magnitude controller 33 (e.g., a first phase and magnitude controller 33-1 interposed on radio-frequency transmission line path 32-1 may control phase and magnitude for radio-frequency signals handled by antenna 30-1, a second phase and magnitude controller 33-2 interposed on radio-frequency transmission line path 32-2 may control phase and magnitude for radio-frequency signals handled by antenna 30-2, an Mth phase and magnitude controller 33-M interposed on radio-frequency transmission line path 32-M may control phase and magnitude for radio-frequency signals handled by antenna 30-M, etc.).

Phase and magnitude controllers 33 may each include circuitry for adjusting the phase of the radio-frequency signals on radio-frequency transmission line paths 32 (e.g., phase shifter circuits) and/or circuitry for adjusting the magnitude of the radio-frequency signals on radio-frequency transmission line paths 32 (e.g., power amplifier and/or low noise amplifier circuits). Phase and magnitude controllers 33 may sometimes be referred to collectively herein as beam steering or beam forming circuitry (e.g., beam steering circuitry that steers the beam of radio-frequency signals transmitted and/or received by phased antenna array 36).

Phase and magnitude controllers 33 may adjust the relative phases and/or magnitudes of the transmitted signals that are provided to each of the antennas in phased antenna array 36 and may adjust the relative phases and/or magnitudes of the received signals that are received by phased antenna array 36. Phase and magnitude controllers 33 may, if desired, include phase detection circuitry for detecting the phases of the received signals that are received by phased antenna array 36. The term “beam,” “signal beam,” “radio-frequency beam,” or “radio-frequency signal beam” may be used herein to collectively refer to wireless signals that are transmitted and received by phased antenna array 36 in a particular direction. The signal beam may exhibit a peak gain that is oriented in a particular beam pointing direction at a corresponding beam pointing angle (e.g., based on constructive and destructive interference from the combination of signals from each antenna in the phased antenna array). The term “transmit beam” may sometimes be used herein to refer to radio-frequency signals that are transmitted in a particular direction whereas the term “receive beam” may sometimes be used herein to refer to radio-frequency signals that are received from a particular direction.

If, for example, phase and magnitude controllers 33 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 33 are adjusted to produce a second set of phases and/or magnitudes for the transmitted signals, the transmitted signals will form a transmit beam as shown by beam B2 that is oriented in the direction of point B. Similarly, if phase and magnitude controllers 33 are adjusted to produce the first set of phases and/or magnitudes, radio-frequency signals (e.g., radio-frequency signals in a receive beam) may be received from the direction of point A, as shown by beam B1. If phase and magnitude controllers 33 are adjusted to produce the second set of phases and/or magnitudes, radio-frequency signals may be received from the direction of point B, as shown by beam B2.

Each phase and magnitude controller 33 may be controlled to produce a desired phase and/or magnitude based on a corresponding control signal S received from control circuitry 38 of FIG. 4 over control paths 34 (e.g., the phase and/or magnitude provided by phase and magnitude controller 33-1 may be controlled using control signal 51 on control path 34-1, the phase and/or magnitude provided by phase and magnitude controller 33-2 may be controlled using control signal S2 on control path 34-2, the phase and/or magnitude provided by phase and magnitude controller 33-M may be controlled using control signal SM on control path 34-M, etc.). If desired, control circuitry 38 may actively adjust control signals S in real time to steer the transmit or receive beam in different desired directions (e.g., to different desired beam pointing angles) over time. Phase and magnitude controllers 33 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 36 and external wireless equipment (e.g., external wireless equipment 10' of FIG. 3). If the external wireless equipment is located at point A of FIG. 4, phase and magnitude controllers 33 may be adjusted to steer the signal beam towards point A (e.g., to form a signal beam having a beam pointing angle directed towards point A). Phased antenna array 36 may then transmit and receive radio-frequency signals in the direction of point A. Similarly, if the external wireless equipment is located at point B, phase and magnitude controllers 33 may be adjusted to steer the signal beam towards point B (e.g., to form a signal beam having a beam pointing angle directed towards point B). Phased antenna array 36 may then transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 36 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Control circuitry 38 of FIG. 4 may form a part of control circuitry 14 of FIG. 3 or may be separate from control circuitry 14 of FIG. 3. Control circuitry 38 of FIG. 4 may identify a desired beam pointing angle for the signal beam of phased antenna array 36 and may adjust the control signals S provided to phased antenna array 36 to configure phased antenna array 36 to form (steer) the signal beam at that beam pointing angle. Each possible beam pointing angle that can be used by phased antenna array 36 during wireless communications may be identified by a beam steering codebook such as codebook 40. Codebook 40 may be stored at control circuitry 38, elsewhere on device 10, or may be located (offloaded) on external equipment and conveyed to device 10 over a wired or wireless communications link.

Codebook 40 may identify each possible beam pointing angle that may be used by phased antenna array 36. Control circuitry 38 may store or identify phase and magnitude settings for phase and magnitude controllers 33 to use in implementing each of those beam pointing angles (e.g., control circuitry 38 or codebook 40 may include information that maps each beam pointing angle for phased antenna array 36 to a corresponding set of phase and magnitude values for phase and magnitude controllers 33). Codebook 40 may be hard-coded or soft-coded into control circuitry 38 or elsewhere in device 10, may include one or more databases stored at control circuitry 38 or elsewhere in device 10 (e.g., codebook 40 may be stored as software code), may include one or more look-up-tables at control circuitry 38 or elsewhere in device 10, and/or may include any other desired data structures stored in hardware and/or software on device 10. Codebook 40 may be generated during calibration of device 10 (e.g., during design, manufacturing, and/or testing of device 10 prior to device 10 being received by an end user) and/or may be dynamically updated over time (e.g., after device 10 has been used by an end user).

Control circuitry 38 may generate control signals S based on codebook 40. For example, control circuitry 38 may identify a beam pointing angle that would be needed to communicate with external wireless equipment 10' of FIG. 3 (e.g., a beam pointing angle pointing towards external wireless equipment 10'). Control circuitry 38 may subsequently identify the beam pointing angle in codebook 40 that is closest to this identified beam pointing angle. Control circuitry 38 may use codebook 40 to generate phase and magnitude values for phase and magnitude controllers 33. Control circuitry 38 may transmit control signals S identifying these phase and magnitude values to phase and magnitude controllers 33 over control paths 34. The beam formed by phased antenna array 36 using control signals S will be oriented at the beam pointing angle identified by codebook 40. If desired, control circuitry 38 may sweep over some or all of the different beam pointing angles identified by codebook 40 until the external wireless equipment is found and may use the corresponding beam pointing angle at which the external wireless equipment was found to communicate with the external wireless equipment (e.g., over communications link 31 of FIG. 3).

Figure 5:
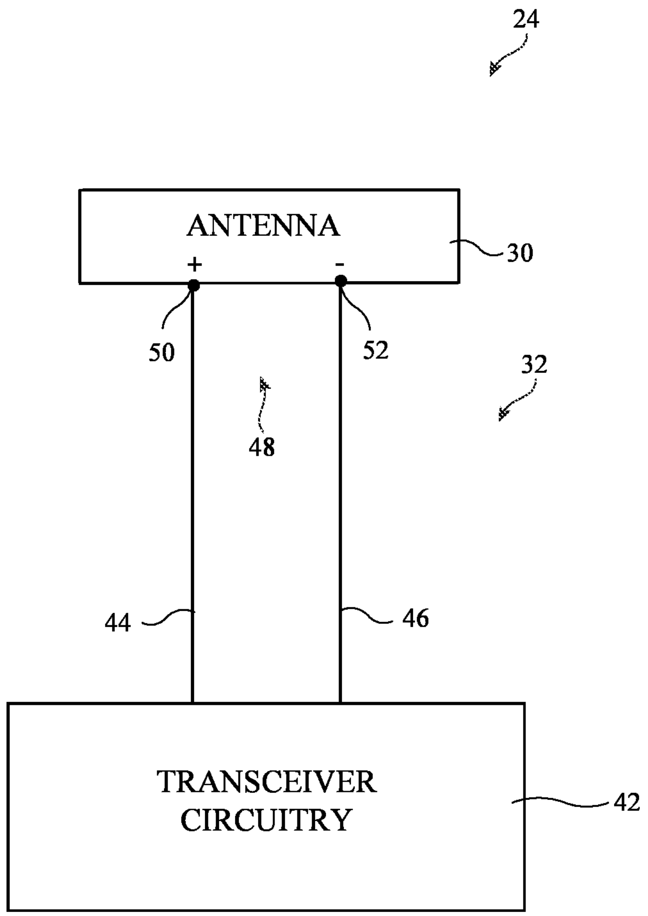
FIG. 5 is a diagram of illustrative wireless circuitry in accordance with some embodiments.

A schematic diagram of an antenna 30 that may be formed in phased antenna array 36 (e.g., as antenna 30-1, 30-2, 30-3, and/or 30-N in phased antenna array 36 of FIG. 4) is shown in FIG. 5. As shown in FIG. 5, antenna 30 may be coupled to transceiver circuitry 42 (e.g., millimeter wave transceiver circuitry 28 of FIG. 3). Transceiver circuitry 42 may be coupled to antenna feed 48 of antenna 30 using radio-frequency transmission line path 32. Antenna feed 48 may include a positive antenna feed terminal such as positive antenna feed terminal 50 and may include a ground antenna feed terminal such as ground antenna feed terminal 52. Radio-frequency transmission line path 32 may include a positive signal conductor such as signal conductor 44 that is coupled to positive antenna feed terminal 50 and a ground conductor such as ground conductor 46 that is coupled to ground antenna feed terminal 52.

Figure 6:
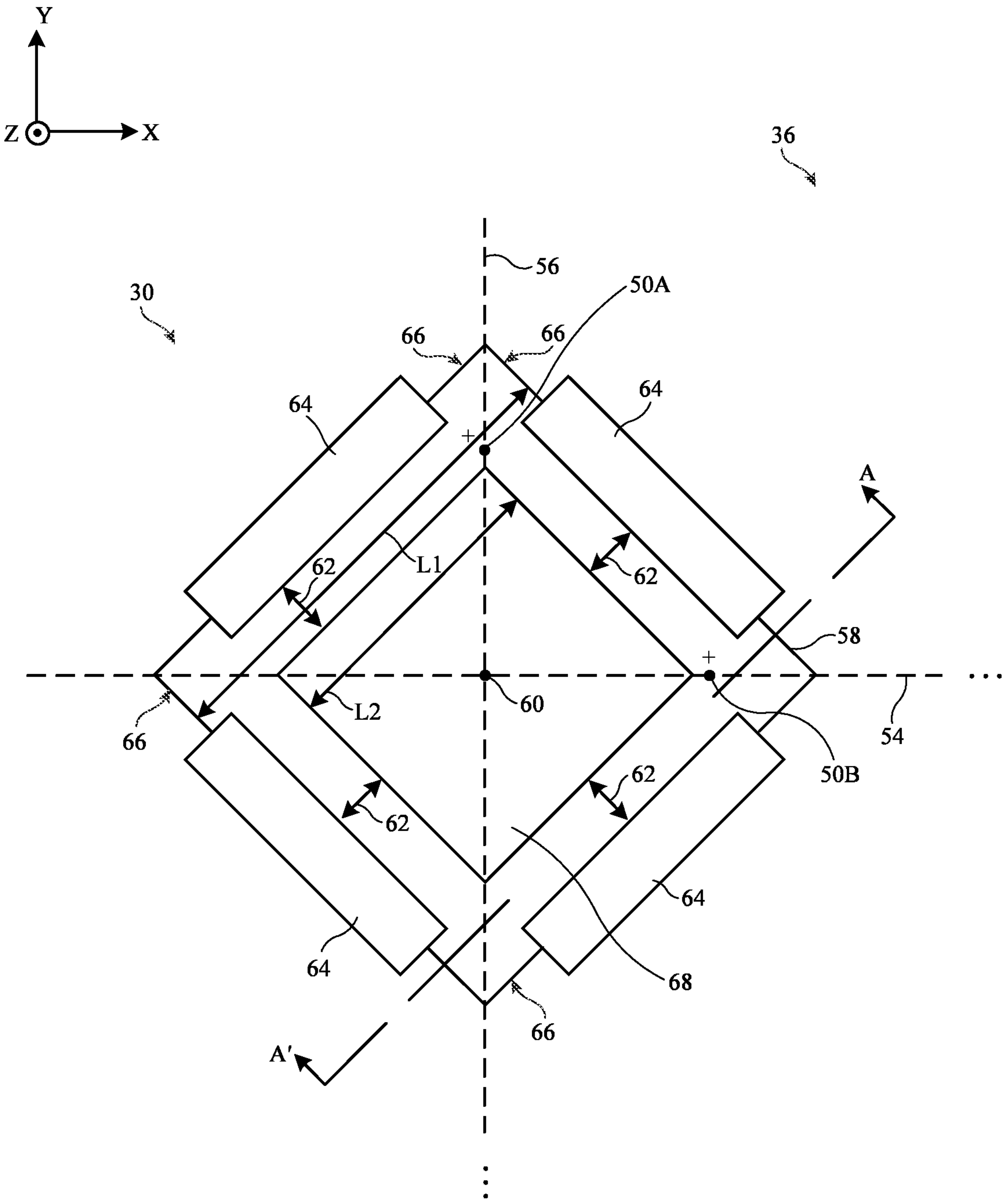
FIG. 6 is a top view of an illustrative antenna having diagonally-oriented feed terminals in accordance with some embodiments.

Any desired antenna structures may be used for implementing antenna 30. In one suitable arrangement that is sometimes described herein as an example, stacked patch antenna structures may be used for implementing antenna 30. Antennas 30 that are implemented using stacked patch antenna structures may sometimes be referred to herein as stacked patch antennas or simply as patch antennas. FIG. 6 is a top view of an illustrative patch antenna that may be used in phased antenna array 36.

As shown in FIG. 6, antenna 30 may have an antenna radiating element that includes patch element 58. Patch element 58 (sometimes referred to herein as patch 58 or conductive patch 58) may be formed from conductive traces on an underlying substrate or from any other desired conductive materials. Patch element 58 may be separated from and extend parallel to an antenna ground (not shown in FIG. 6 for the sake of clarity).

Patch element 58 may have edges (sides) 66. The length of edges 66 may be selected so that antenna 30 resonates (radiates) at desired operating frequencies. In one suitable arrangement that is described herein as an example, patch element 58 is a square patch having edges 66 of length L1 (e.g., where patch element 58 has a first pair of parallel edges 66 and a second pair of parallel edges 66 extending orthogonal to and between the first pair of parallel edges 66). Length L1 may be selected to be approximately equal to half of the wavelength of the signals conveyed by antenna 30 (e.g., the effective wavelength given the dielectric properties of the materials surrounding patch element 58). In one suitable arrangement, this length may be between 0.8 mm and 1.2 mm (e.g., approximately 1.1 mm) for covering a millimeter wave frequency band between 57 GHz and 70 GHz, as just one example. The example of FIG. 6 merely illustrative. If desired, patch element 58 may have a non-square rectangular shape having two edges of length L1 and having two edges of a different length (e.g., for covering multiple frequency bands). In general, patch element 58 may be formed in any desired shape having any desired number of straight and/or curved edges.

To enhance the polarizations handled by antenna 30, antenna 30 may be provided with multiple antenna feeds. As shown in FIG. 6, antenna 30 may include a first antenna feed having positive antenna feed terminal 50A and may include a second antenna feed having positive antenna feed terminal 50B. Positive antenna feed terminals 50A and 50B may be coupled to transceiver circuitry 42 (FIG. 5) using respective radio-frequency transmission line paths 32, for example. Positive antenna feed terminals 50A and 50B may be coupled to patch element 58.

When using positive antenna feed terminal 50A, antenna 30 may transmit and/or receive radio-frequency signals with a first polarization (e.g., a first linear polarization). When using positive antenna feed terminal 50B, antenna 30 may transmit and/or receive radio-frequency signals with a second polarization (e.g., a second linear polarization). The second polarization may be orthogonal to the first polarization. This is merely illustrative and, if desired, positive antenna feed terminals 50A and 50B may be used to convey radio-frequency signals with other polarizations (e.g., elliptical polarizations, circular polarizations, etc.). Antenna 30 may include only one of positive antenna feed terminals 50A or 50B if desired (e.g., antenna 30 need not be a dual-polarization antenna).

In order to increase the bandwidth of antenna 30, antenna 30 may include one or more parasitic elements layered over (e.g., overlapping) patch element 58. As shown in FIG. 6, a parasitic antenna resonating element such as parasitic patch 68 may be formed from conductive traces layered over patch element 58. Patch element 58 may, for example, be formed from conductive traces patterned onto a first layer of a dielectric substrate whereas parasitic patch 68 is formed from conductive traces patterned onto a second layer of the dielectric substrate (e.g., where the first and second layers are vertically stacked on top of each other in the direction of the Z-axis of FIG. 6).

Parasitic patch 68 may sometimes be referred to herein as parasitic resonating element 68, parasitic antenna element 68, parasitic element 68, parasitic conductor 68, parasitic structure 68, or patch 68. Parasitic patch 68 is not directly fed, whereas patch element 58 is directly fed via positive antenna feed terminals 50A and 50B. Parasitic patch 68 may create a constructive perturbation of the electromagnetic field generated by patch element 58, creating a new resonance for antenna 30. This may serve to broaden the overall bandwidth of antenna 30 (e.g., to cover an entire frequency band from about 57 GHz to 71 GHz).

In one suitable arrangement that is described herein as an example, parasitic patch 68 is a square patch having edges (sides) of length L2. The edges of parasitic patch 68 may be oriented parallel to the edges 66 of patch element 58 (e.g., parasitic patch 68 may be aligned with patch element 58). Length L2 may be less than length L1 of patch element 58. The example of FIG. 6 merely illustrative. If desired, parasitic patch 68 may have a non-square rectangular shape or any other desired shape having any desired number of straight and/or curved edges. If desired, antenna 30 may include additional parasitic elements that are coplanar with parasitic patch 68.

For example, as shown in FIG. 6, antenna 30 may include additional parasitic patches 64 (sometimes be referred to herein as parasitic resonating elements 64, parasitic antenna elements 64, parasitic elements 64, parasitic conductors 64, parasitic structures 64, or patches 64). Parasitic patches 64 may be coplanar with parasitic patch 102. Each parasitic patch 64 may be separated from a corresponding edge of parasitic patch 68 by a respective gap 62. Each parasitic patch 64 may, if desired, overlap a respective edge 66 of the underlying patch element 58. Each parasitic patch 64 may be the same size and shape, for example.

In one suitable arrangement that is described herein as an example, parasitic patches 64 are rectangular patches having edges (sides) that are shorter than length L1 and that are greater than, equal to, or less than length L2. The example of FIG. 6 merely illustrative. If desired, parasitic patches 64 may have other non-square rectangular shapes or any other desired shapes having any desired number of straight and/or curved edges. Gaps 62 (sometimes referred to herein as openings 62 or slots 62) may help to mitigate the trapping of radio-frequency energy between the parasitic elements and patch element 58, for example. Parasitic patches 64 and 68 may sometimes be referred to herein collectively as single-layer parasitic antenna resonating elements, single-layer parasitic elements, single-layer parasitic patches, or single-layer parasitic structures for antenna 30.

Each antenna 30 in phased antenna array 36 may include a corresponding patch element 58 and overlying single-layer parasitic structures. The antennas 30 in phased antenna array 36 may be arranged in an array pattern having any desired number of rows (e.g., extending along a longitudinal axis parallel to the X-axis) and/or any desired number of columns (e.g., extending along a longitudinal axis parallel to the Y-axis). If care is not taken, the antennas 30 in phased antenna array 36 may exhibit undesirable mutual coupling with one or more adjacent antennas 30 in phased antenna array 36. Such mutual coupling can undesirably limit the overall antenna efficiency of each antenna 30. In order to mitigate mutual coupling in phased antenna array 36, antenna 30 may be diagonally-oriented with respect to the rows and columns of phased antenna array 36 and may include diagonally-oriented positive antenna feed terminals 50A and 50B. For example, as shown in FIG. 6, patch element 58, parasitic patch 68, and parasitic patches 64 may be rotated (e.g., about a central axis 60 extending parallel to the Z-axis) at a non-zero angle with respect to the direction of the rows and columns in phased antenna array 36 (e.g., with respect to the X and Y-axes of FIG. 6). In one suitable arrangement that is described herein as an example, the non-zero angle is 45 degrees. Other non-zero angles may be used if desired (e.g., 40-50 degrees, 35-55 degrees, 44-46 degrees, etc.).

Patch element 58 may have a first diagonal axis 54 and a second diagonal axis 56. Diagonal axis 54 may extend through central axis 60 and a first pair of opposing corners of patch element 58. Diagonal axis 56 may be perpendicular to diagonal axis 54. Diagonal axis 56 may extend through central axis 60 and a second pair of opposing corners of patch element 58. As parasitic patch 68 is also centered about central axis 60, diagonal axis 56 also passes through a first pair of opposing corners of parasitic patch 68.

Similarly, diagonal axis 54 also passes through a second pair of opposing corners of parasitic patch 68.

When oriented in this way, each of the antennas 30 along a given row of phased antenna array 36 may have a central axis (e.g., central axis 60) that intersects the diagonal axis 54 of each antenna 30 in that row of phased antenna array 36. Similarly, each of the antennas 30 along a given column of phased antenna array 36 may have a central axis that intersects the diagonal axis 56 of each antenna 30 in that column of phased antenna array 36. In other words, diagonal axis 54 may form the longitudinal axis for a given row of antennas 30 (e.g., where each antenna 30 in the row is aligned along the longitudinal axis for that row) and diagonal axis 56 may form the longitudinal axis for a given column of antennas 30 in phased antenna array 36 (e.g., where each antenna 30 in the column is aligned along the longitudinal axis for that column). When oriented in this way, edges 66 of patch element 58 and the edges of parasitic patch 68 are each oriented at the non-zero angle (e.g., 45 degrees) with respect to diagonal axes 56 and 54 and with respect to the direction (e.g., the longitudinal axes) of the rows and the columns in phased antenna array 36.

Diagonally orienting the antennas 30 in phased antenna array 36 in this way may serve to minimize mutual coupling between the antennas in the phased antenna array, thereby maximizing the overall antenna efficiency of each of the antennas. In order to further mitigate mutual coupling and optimize antenna efficiency (e.g., relative to scenarios where positive antenna feed terminals 50A and 50B are located along respective edges 66 of patch element 58), positive antenna feed terminal 50A may be coupled to patch element 58 at a location along diagonal axis 56. Similarly, positive antenna feed terminal 50B may be coupled to patch element 58 at a location along diagonal axis 54. The distance between positive antenna feed terminal 50A and central axis 60 (e.g., along diagonal axis 56) and the distance between positive antenna feed terminal 50B and central axis 60 (e.g., along diagonal axis 54) may be selected to perform impedance matching for antenna 30, for example. Feeding antenna 30 in this way may also allow antenna 30 to continue to convey linearly-polarized signals (e.g., horizontal and vertically polarized signals) using positive antenna feed terminals 50A and 50B, for example.

Figure 7:
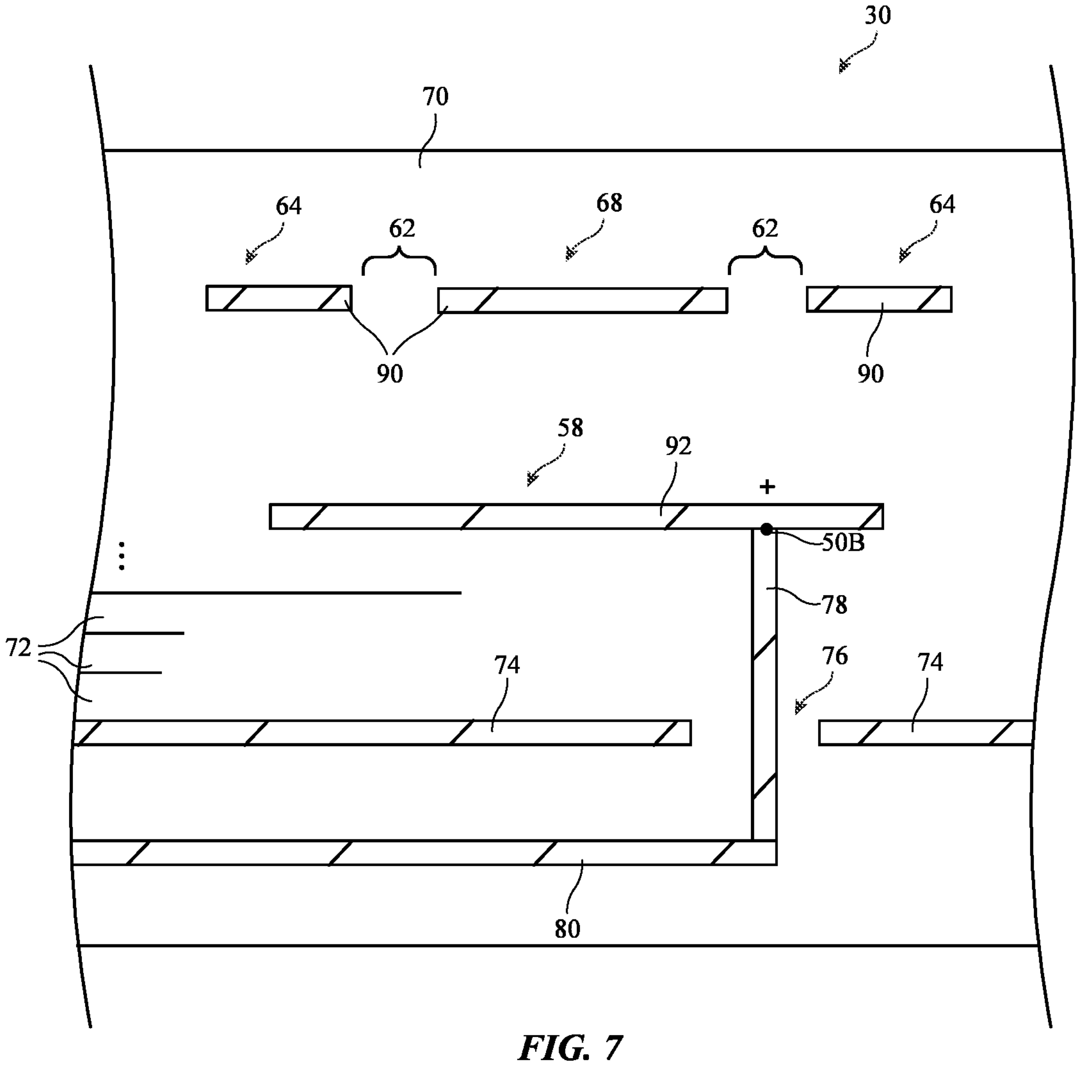
FIG. 7 is a cross-sectional side view of an illustrative antenna having diagonally-oriented feed terminals in accordance with some embodiments.

FIG. 7 is a cross-sectional side view of antenna 30 (e.g., as taken in the direction of line AA' of FIG. 6). As shown in FIG. 7, antenna 30 may be formed on a dielectric substrate such as substrate 70. If desired, each of the antennas in the phased antenna array may be formed on the same dielectric substrate (e.g., in an integrated antenna module having a radio-frequency integrated circuit mounted to substrate 70). Substrate 70 may be, for example, a rigid or printed circuit board or another dielectric substrate. Substrate 70 may include multiple stacked dielectric layers 72 (e.g., layers of printed circuit board substrate, layers of fiberglass-filled epoxy, layers of polyimide, layers of ceramic substrate, or layers of other dielectric materials).

With this type of arrangement, antenna 30 may be embedded within the layers of substrate 70. For example, patch element 58 may be formed from conductive traces 92 patterned on a first layer 72 of substrate 70. Parasitic patches 68 and 64 may be formed from conductive traces 90 patterned on a second layer 72 of substrate 70. The second layer may be stacked over the first layer of substrate 70. Zero, one, or more than one additional layer 72 may be vertically interposed between the first and second layers 72 if desired. Gaps 62 in conductive traces 90 may separate parasitic patch 68 from parasitic patches 64.

Antenna 30 may have an antenna ground that includes ground traces 74 (e.g., a ground plane for antenna 30). The same ground traces 74 may be used to form the antenna ground for each antenna in the phased antenna array if desired. Patch element 58 may be separated from and may extend parallel to ground traces 74. One or more layers 72 of substrate 70 may be vertically interposed between ground traces 74 and patch element 58. Zero, one, or more than one layer 72 in substrate 70 may be vertically interposed between conductive traces 90 and the exterior of substrate 70.

Ground traces 74 may have openings such as opening 76. Signal traces 80 may be patterned on one or more of the layers 72 in substrate 70 (e.g., ground traces 74 may be vertically interposed between signal traces 80 and patch element 58). Signal traces 80 may, for example, form the signal conductor of the radio-frequency transmission line path for antenna 30 (e.g., signal conductor 44 in radio-frequency transmission line path 32 of FIG. 5). A conductive via such as conductive via 78 may couple signal traces 80 to patch element 58 (e.g., at positive antenna feed terminal 50B). Similar feeding structures may be used to feed positive antenna feed terminal 50A (FIG. 6). As shown in FIG. 7, parasitic patches 68 and 64 are not directly fed by positive antenna feed terminal 50B.

Figure 8:
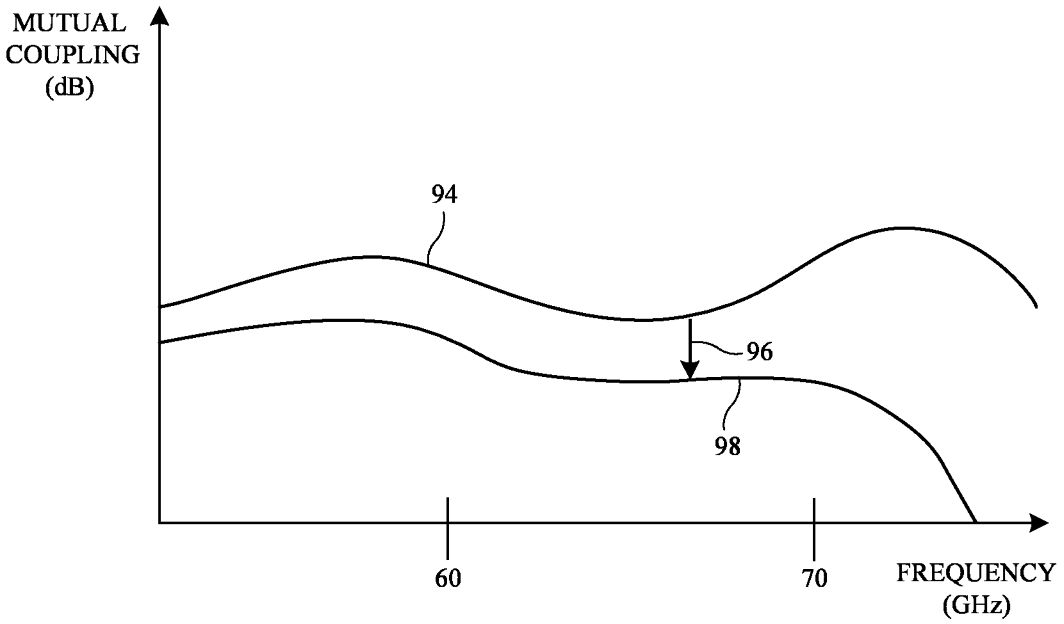
FIG. 8 is a plot of antenna performance (mutual coupling) as a function of frequency for an illustrative antenna having diagonally-oriented feed terminals in accordance with some embodiments.

FIG. 8 is a plot of antenna performance (mutual coupling) as a function of frequency for a given antenna 30 in phased antenna array 36 (FIG. 6). As shown in FIG. 8, curve 94 plots the mutual coupling of antenna 30 in scenarios where the antennas are not rotated by the non-zero angle with respect to the X and Y axes of FIG. 6 and where the antennas are fed using positive antenna feed terminals 50A and 50B located along orthogonal edges 66 of patch element 58.

Curve 98 plots the mutual coupling of antenna 30 in scenarios where the antennas in the phased antenna array are oriented and fed as shown in FIG. 6. As shown by curves 98 and 94, rotating the antenna elements and feeding the antenna along diagonal axes 54 and 56 may serve to reduce mutual coupling across the frequency band of operation of antenna 30, as shown by arrow 96. This reduction in mutual coupling may serve to increase the overall antenna efficiency of antenna 30, for example. The example of FIG. 8 is merely illustrative. In practice, curves 94 and 98 may have other shapes. Antenna 30 may convey radio-frequency signals at any desired frequencies (e.g., frequencies greater than 10 GHz).

Figure 9:
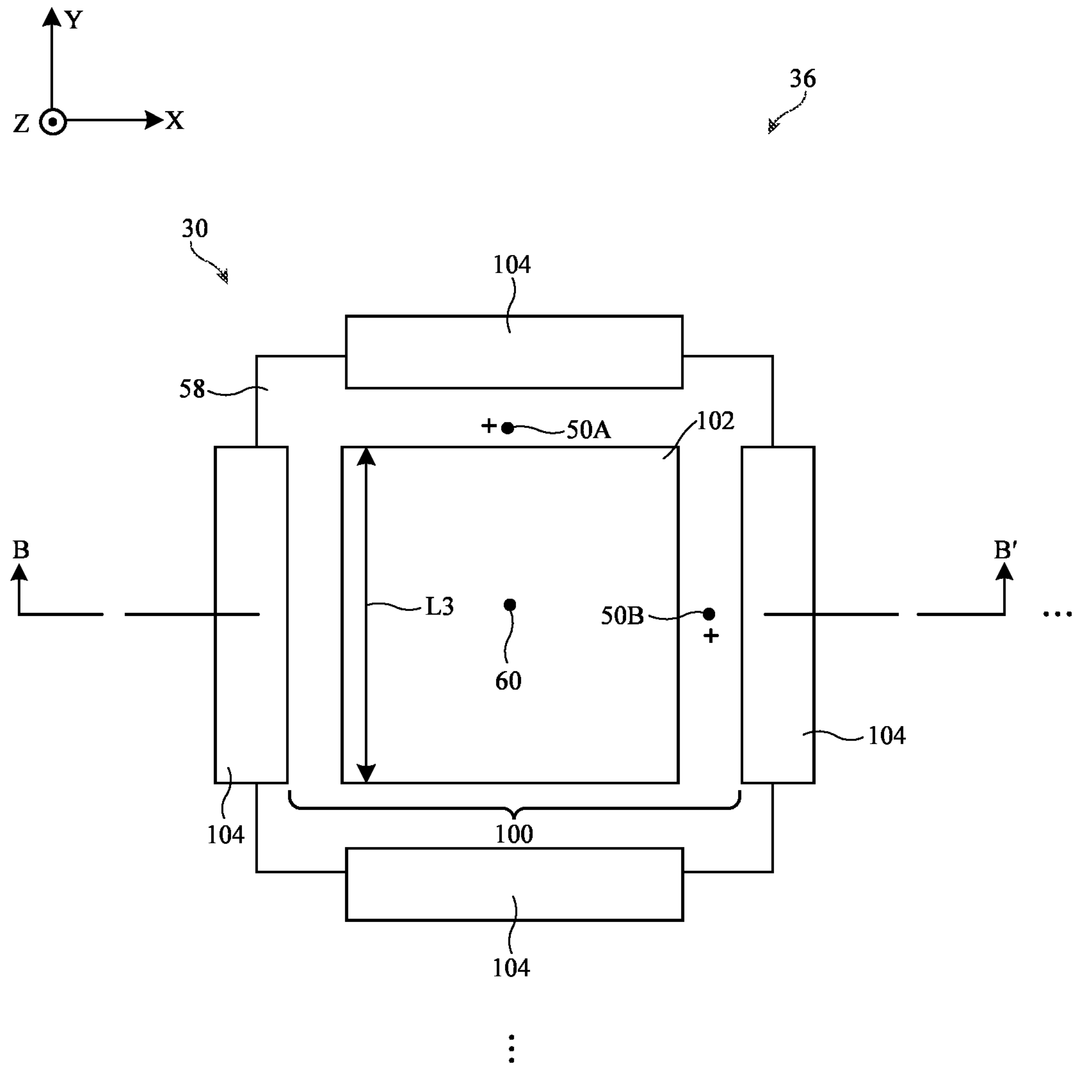
FIG. 9 is a top view of an illustrative antenna having multi-layer parasitic elements in accordance with some embodiments.

In the example of FIGS. 6-8, the parasitic patches in antenna 30 are confined to a single layer 72 of substrate 70. If desired, the parasitic patches in antenna 30 may be distributed across two or more layers 72 of substrate 70. FIG. 9 is a top view of an antenna 30 having parasitic patches distributed across multiple layers of the substrate.

As shown in FIG. 9, antenna 30 may include a parasitic patch such as parasitic patch 102 (sometimes referred to herein as parasitic resonating element 102, parasitic antenna element 102, parasitic element 102, parasitic conductor 102, parasitic structure 102, or patch 102). Parasitic patch 102 and patch element 58 may be centered about central axis 60. In one suitable arrangement that is described herein as an example, parasitic patch 102 is a square patch having edges (sides) of length L3. Length L3 may be less than the length of the edges of patch element 58 (e.g., length L1 as shown in FIG. 6). The edges of parasitic patch 102 may be oriented parallel to the edges of patch element 58 (e.g., parasitic patch 102 may be aligned with patch element 58). The example of FIG. 9 merely illustrative. If desired, parasitic patch 102 may have a non-square rectangular shape or any other desired shape having any desired number of straight and/or curved edges.

Antenna 30 may also include additional parasitic patches 104 (sometimes be referred to herein as parasitic resonating elements 104, parasitic antenna elements 104, parasitic elements 104, parasitic conductors 104, parasitic structures 104, or patches 104). Parasitic patches 104 may be located at a different distance from patch element 58 than parasitic patch 102. For example, parasitic patches 104 may be located at a first distance from (over) patch element 58 whereas parasitic patch 102 is located at a second distance that is greater than the first distance from patch element 58. Each parasitic patch 104 may be separated from an opposing parasitic patch 104 by gap 100. Gap 100 may overlap patch element 58 and central axis 60. Parasitic patch 102 may overlap gap 100. In the example of FIG. 9, parasitic patch 102 is non-overlapping with respect to parasitic patches 104. In another suitable arrangement, parasitic patches 104 may partially overlap parasitic patch 102. Each parasitic patch 104 may, if desired, overlap a respective edge of the underlying patch element 58.

If desired, each parasitic patch 104 may be the same size and shape. In one suitable arrangement that is described herein as an example, parasitic patches 104 are rectangular patches having edges (sides) that are shorter than length L1 (FIG. 6) and that are greater than, equal to, or less than length L3. Each parasitic patch 104 may have edges that are oriented parallel to the edges of patch element 58 and parasitic patch 102. The example of FIG. 9 merely illustrative. If desired, parasitic patches 104 may have other rectangular shapes or any other desired shapes having any desired number of straight and/or curved edges. Parasitic patches 104 and 102 may sometimes be referred to herein collectively as multi-layer parasitic antenna resonating elements, multi-layer parasitic elements, multi-layer parasitic patches, or multi-layer parasitic structures for antenna 30.

In the example of FIG. 9, the edges of parasitic patches 104 and 102 and the edges of patch element 58 are oriented parallel to the direction of the rows and columns in phased antenna array 36. Positive antenna feed terminals 50A and 50B may be coupled to patch element 58 along orthogonal edges of patch element 58. This example is merely illustrative. In another suitable arrangement, parasitic patches 104 and 102 and patch element 58 may be rotated at a non-zero (e.g., 45 degree) angle with respect to the direction of the rows and columns in phased antenna array 36 and patch element 58 may be fed along the diagonal axes of patch element 58 (e.g., antenna 30 may be rotated and fed as shown in FIG. 6 but may include the multi-layer parasitic structures of FIG. 9).

Figure 10:
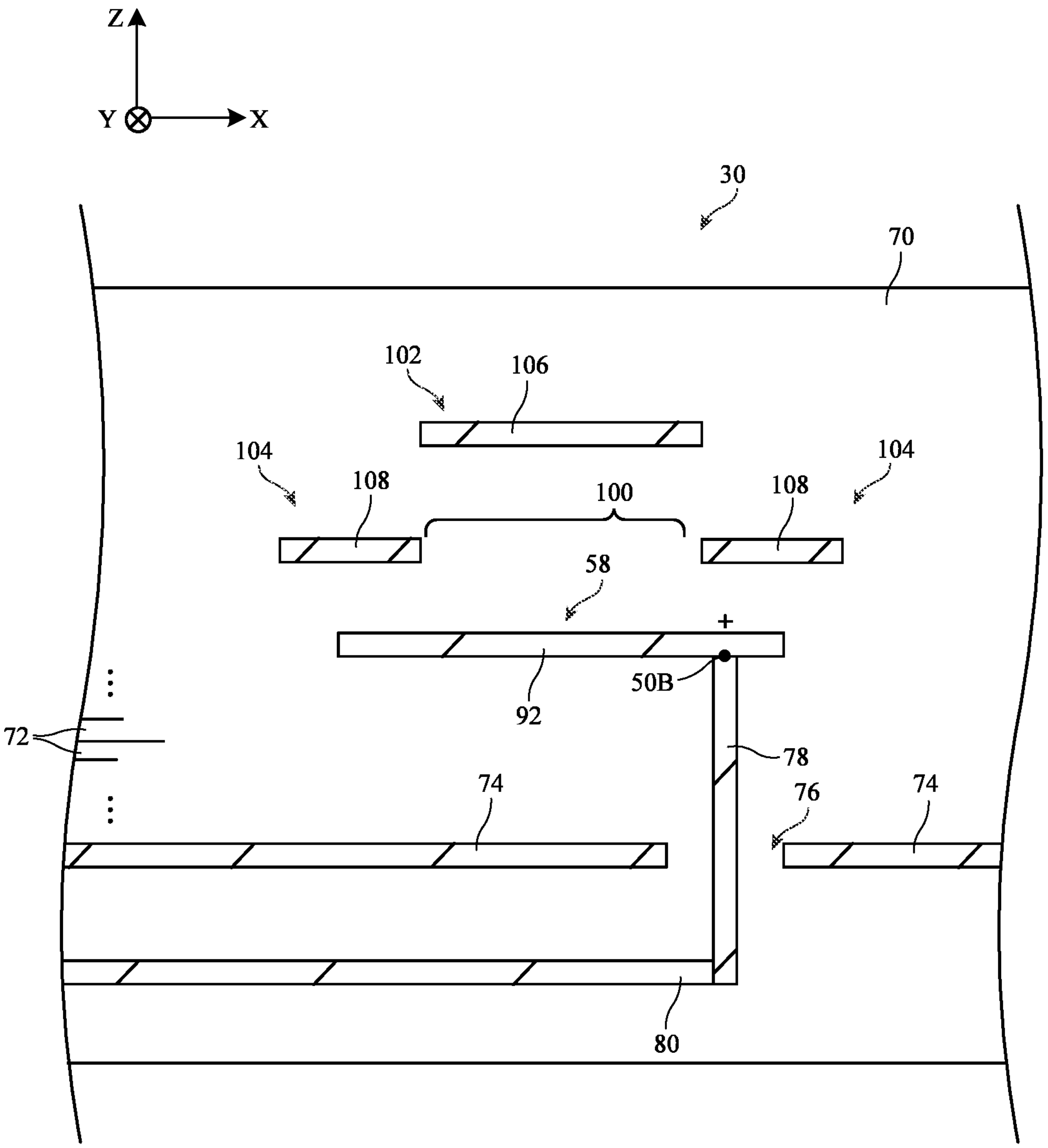
FIG. 10 is a cross-sectional side view of an illustrative antenna having multi-layer parasitic elements in accordance with some embodiments.

FIG. 10 is a cross-sectional side view of antenna 30 having multi-layer parasitic structures (e.g., as taken in the direction of line BB' of FIG. 9). As shown in FIG. 10, patch element 58 may be formed from conductive traces 92 patterned on a first layer 72 of substrate 70. Parasitic patches 104 may be formed from conductive traces 108 patterned on a second layer 72 of substrate 70. The second layer may be stacked over the first layer of substrate 70. Zero, one, or more than one additional layer 72 may be vertically interposed between the first and second layers 72 if desired. Parasitic patch 102 may be formed from conductive traces 106 patterned on a third layer 72 of substrate 70. The third layer may be stacked over the second layer of substrate 70. Zero, one, or more than one additional layer 72 may be vertically interposed between the second and third layers 72 if desired.

Parasitic patches 104 may be separated by gap 100 overlapping patch element 58. Parasitic patch 102 may overlap gap 100 and patch element 58. Patch element 58 may be directly fed whereas parasitic patches 104 and 102 are not directly fed (e.g., each of the parasitic patches is floating). First capacitances may be established between parasitic patch 102 and each of the parasitic patches 104. Second capacitances may be established between each of the parasitic patches 104 and patch element 58. These capacitances may serve to increase the total capacitance between patch element 58 and the upper-most parasitic patch relative to arrangements where antenna 30 includes single-layer parasitic structures, which may allow antenna 30 to exhibit an even more compact volume relative to arrangements where antenna 30 includes single-layer parasitic structures, for example.

When arranged in this way, the parasitic patches may provide freedom to fine tune the radio-frequency performance of antenna 30 for compensating for changes in dielectric thickness, dielectric constant, radome material (e.g., for a radome placed over antenna 30), copper thickness, etc., without changing the antenna radiation mechanism or radiation pattern. In other words, the lateral footprint of antenna 30 of FIGS. 9 and 10 (e.g., as defined by a square running through the outer-most edges of parasitic patches 104 as shown in FIG. 9) may be smaller than the lateral footprint of antenna 30 of FIGS. 6 and 7 (e.g., as defined by a rotated square running through the outer-most edges of parasitic patches 64 as shown in FIG. 6). Conversely, when antenna 30 of FIGS. 9 and 10 is configured to exhibit the same lateral footprint as antenna 30 of FIGS. 6 and 7, antenna 30 may exhibit increased bandwidth relative to antenna 30 of FIGS. 6 and 7.

Figure 11:
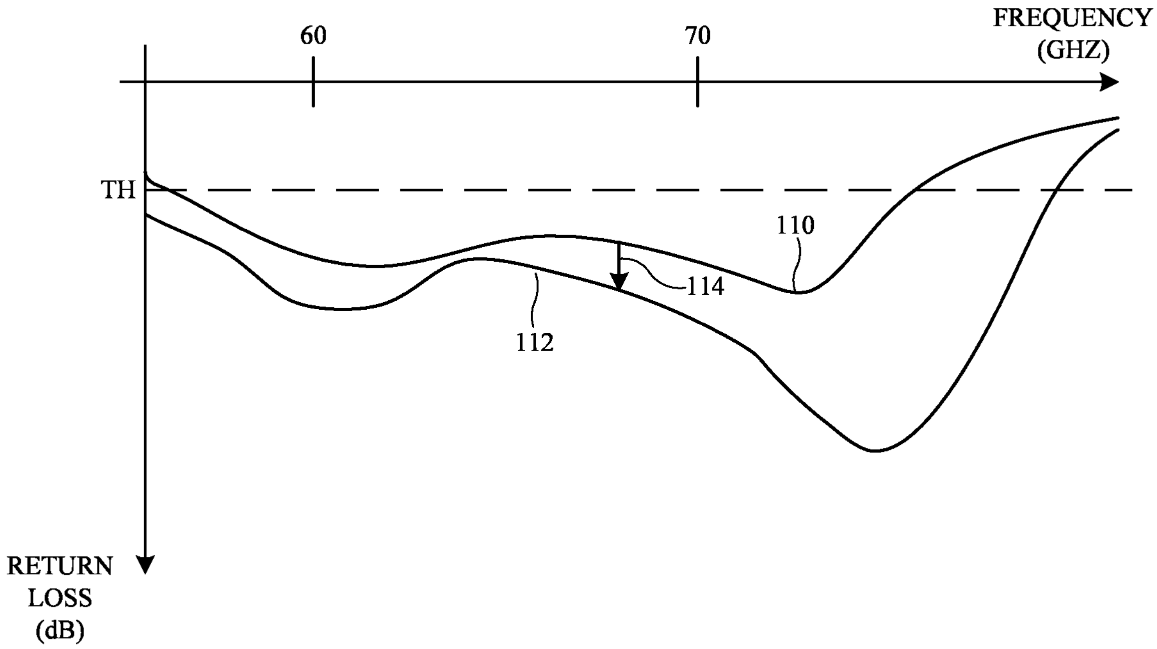
FIG. 11 is a plot of antenna performance (return loss) as a function of frequency for illustrative antennas in accordance with some embodiments.

FIG. 11 is a plot of antenna performance (return loss) as a function of frequency for a given antenna 30 (e.g., an antenna 30 having a given lateral footprint). As shown in FIG. 11, curve 110 plots the return loss of an antenna 30 having single-layer parasitic structures (e.g., antenna 30 of FIGS. 6 and 7). Curve 112 plots the return loss of an antenna 30 having multi-layer parasitic structures (e.g., antenna 30 of FIGS. 9 and 10). As shown by curves 110 and 112, antenna 30 may exhibit satisfactory return loss (e.g., a return loss less than threshold level TH) across the frequency band of operation of the antenna. However, forming antenna 30 using multi-layer parasitic structures (e.g., as shown in FIGS. 9 and 10) may further reduce the return loss of the antenna, as shown by arrow 114.

The example of FIG. 11 is merely illustrative. In practice, curves 110 and 112 may have other shapes. Antenna 30 may convey radio-frequency signals at any desired frequencies (e.g., frequencies greater than 10 GHz).

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a housing having a dielectric wall;
a display mounted to the housing opposite the dielectric wall;
a substrate having a surface facing the dielectric wall; and
an antenna configured to radiate through the dielectric wall, wherein the antenna includes
a directly fed patch embedded in the substrate, wherein the directly fed patch is rectangular and has a first corner, a second corner, and a diagonal axis passing through the first and second corners;
a conductive via in the substrate and coupled to the directly fed patch along the diagonal axis;
a first parasitic patch on the surface of the substrate and overlapping the directly fed patch,
a second parasitic patch on the surface of the substrate and separated from a first edge of the first parasitic patch by a first gap,
a third parasitic patch on the surface of the substrate and separated from a second edge of the first parasitic patch by a second gap,
a fourth parasitic patch on the surface of the substrate and separated from a third edge of the first parasitic patch by a third gap, and
a fifth parasitic patch on the surface of the substrate and separated from a fourth edge of the first parasitic patch by a fourth gap.

2. The electronic device of claim 1, wherein the first parasitic patch has a first length, the second parasitic patch has a second length equal to the first length, the third parasitic patch has a third length equal to the first length, the fourth parasitic patch has a fourth length equal to the first length, and the fifth parasitic patch has a fifth length equal to the first length.

3. The electronic device of claim 1, wherein the second parasitic patch at least partially overlaps the directly fed patch, the third parasitic patch at least partially overlaps the directly fed patch, the fourth parasitic patch at least partially overlaps the directly fed patch, and the fifth parasitic patch at least partially overlaps the directly fed patch.

4. The electronic device of claim 3, wherein the directly fed patch has a fifth edge parallel to the first edge, a sixth edge parallel to the second edge, a seventh edge parallel to the third edge, and an eighth edge parallel to the fourth edge.

5. The electronic device of claim 4, wherein the second parasitic patch overlaps the fifth edge, the third parasitic patch overlaps the sixth edge, the fourth parasitic patch overlaps the seventh edge, and the fifth parasitic patch overlaps the eighth edge.

6. The electronic device of claim 1, wherein the first and second edges of the first parasitic patch extend parallel to each other and have a first length, the third and fourth edges of the first parasitic patch extend orthogonal to the first and second edges and have the first length, the second, third, fourth, and fifth parasitic patches each has a second length equal to the first length, and the second, third, fourth, and fifth parasitic patches each has a width less than the second length.

7. The electronic device of claim 1, further comprising:
a transmission line having a signal trace coupled to the conductive via.

8. The electronic device of claim 1, wherein the directly fed patch has a third and fourth corners and an additional diagonal axis passing through the third corner and the fourth corner, the electronic device further comprising:
an additional conductive via in the substrate and coupled to the directly fed patch along the additional diagonal axis.

9. The electronic device of claim 8, further comprising:
an additional antenna configured to radiate through the dielectric wall, wherein the additional antenna includes an additional directly fed patch embedded in the substrate, the additional directly fed patch is rectangular, has a fifth corner, a sixth corner opposite the fifth corner, a seventh corner, and an eighth corner opposite the seventh corner, and the diagonal axis of the directly fed patch passes through the fifth corner and the sixth corner of the additional directly fed patch.

10. The electronic device of claim 1, wherein the directly fed patch is square, the first parasitic patch is square, and the second, third, fourth, and fifth parasitic patches are polygonal and non-square.

11. The electronic device of claim 10, further comprising:
a phased antenna array that includes the antenna and that includes an additional antenna, wherein
the additional antenna includes an additional directly fed patch embedded in the substrate,
a center of the directly fed patch and a center of the additional directly fed patch are aligned along a linear axis,
the additional directly fed patch is square,
the first, second, third, and fourth edges of the directly fed patch are non-parallel and non-perpendicular with respect to the linear axis, and
four edges of the additional directly fed patch are non-parallel and non-perpendicular with respect to the linear axis.

12. The electronic device of claim 1, wherein the housing comprises conductive sidewalls that extend around a periphery of the display, the display and the dielectric wall are mounted to the conductive sidewalls, and the dielectric wall comprises glass.

13. The electronic device of claim 1, wherein the first edge is parallel to the third edge, the first gap extends parallel to the third gap, the second edge is parallel to the fourth edge, the second gap extends parallel to the fourth gap, the first edge is orthogonal to the second edge, and the second gap extends orthogonal to the first gap.

14. The electronic device of claim 1, wherein:
the directly fed patch is square,
the directly fed patch is fed at a positive antenna feed terminal coupled to the directly fed patch along a diagonal axis of the directly fed patch,
the first parasitic patch is square,
the diagonal axis overlaps first and second corners of the first parasitic patch, and
the diagonal axis does not overlap the second, third, fourth, and fifth parasitic patches.

15. An electronic device comprising:
a housing having a dielectric wall;
a display mounted to the housing opposite the dielectric wall;
a substrate having a surface facing the dielectric wall; and
a phased antenna array configured to radiate through the dielectric wall, wherein the phased antenna array includes a first antenna and a second antenna, and the first antenna includes
a first directly fed patch embedded in the substrate,
a first parasitic patch on the surface of the substrate and overlapping the first directly fed patch, a second parasitic patch on the surface of the substrate and separated from a first edge of the first parasitic patch by a first gap, a third parasitic patch on the surface of the substrate and separated from a second edge of the first parasitic patch by a second gap, a fourth parasitic patch on the surface of the substrate and separated from a third edge of the first parasitic patch by a third gap, and a fifth parasitic patch on the surface of the substrate and separated from a fourth edge of the first parasitic patch by a fourth gap, wherein the second antenna includes a second directly fed patch embedded in the substrate, a center of the first directly fed patch and a center of the second directly fed patch are aligned along a linear axis, the second directly fed patch is square, the first, second, third, and fourth edges of the first directly fed patch are non-parallel and non-perpendicular with respect to the linear axis, and four edges of the second directly fed patch are non-parallel and non-perpendicular with respect to the linear axis, the second antenna including a sixth parasitic patch on the surface of the substrate and overlapping the second directly fed patch, a seventh parasitic patch on the surface of the substrate and separated from a fifth edge of the sixth parasitic patch by a fifth gap, an eighth parasitic patch on the surface of the substrate and separated from a sixth edge of the sixth parasitic patch by a sixth gap, a ninth parasitic patch on the surface of the substrate and separated from a seventh edge of the sixth parasitic patch by a seventh gap, and a tenth parasitic patch on the surface of the substrate and separated from an eighth edge of the sixth parasitic patch by an eighth gap, wherein the sixth parasitic patch is square, the seventh, eighth, ninth, and tenth parasitic patches are polygonal and non-square, the linear axis overlaps first and second corners of the first parasitic patch, the linear axis overlaps third and fourth corners of the sixth parasitic patch, and the linear axis does not overlap the second, third, fourth, fifth, seventh, eighth, ninth, and tenth parasitic patches.

16. An electronic device comprising:

a housing that includes a dielectric wall;

a display mounted to the housing opposite the dielectric wall;

a substrate, wherein a surface of the substrate faces the dielectric wall; and an antenna configured to convey radio-frequency signals through the dielectric wall, wherein the antenna includes a rectangular metal patch embedded in the substrate and having a diagonal axis, an antenna feed terminal coupled to the rectangular metal patch along the diagonal axis;

a first parasitic patch on the surface of the substrate and overlapping the rectangular metal patch, a second parasitic patch on the surface of the substrate and separated from a first edge of the first parasitic patch by a first gap, a third parasitic patch on the surface of the substrate and separated from a second edge of the first parasitic patch by a second gap, a fourth parasitic patch on the surface of the substrate and separated from a third edge of the first parasitic patch by a third gap, and a fifth parasitic patch on the surface of the substrate and separated from a fourth edge of the first parasitic patch by a fourth gap.

17. The electronic device of claim 16, wherein the substrate comprises a printed circuit board substrate.

18. The electronic device of claim 16, wherein the rectangular metal patch is square.

19. The electronic device of claim 16, further comprising a conductive via in the substrate and coupled to the rectangular metal patch at the antenna feed terminal.

* * * * *